(12) United States Patent
Li et al.

(10) Patent No.: US 12,603,296 B2
(45) Date of Patent: Apr. 14, 2026

(54) CLAD CURRENT COLLECTORS INCLUDING THERMAL INTERFACE LAYER FOR BIPOLAR SOLID-STATE BATTERIES

(71) Applicant: GM GLOBAL TECHNOLOGY OPERATIONS LLC, Detroit, MI (US)

(72) Inventors: Zhe Li, Anda (CN); Dave G. Rich, Sterling Heights, MI (US); Meiyuan Wu, Shanghai (CN); Jingyuan Liu, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 852 days.

(21) Appl. No.: 17/888,613

(22) Filed: Aug. 16, 2022

(65) Prior Publication Data

US 2024/0038998 A1 Feb. 1, 2024

(30) Foreign Application Priority Data

Jul. 29, 2022 (CN) .......................... 202210906230.9

(51) Int. Cl.
*H01M 4/66* (2006.01)
*H01M 4/02* (2006.01)
*H01M 10/0585* (2010.01)

(52) U.S. Cl.
CPC ........... *H01M 4/667* (2013.01); *H01M 4/661* (2013.01); *H01M 4/663* (2013.01); *H01M*

*4/668* (2013.01); *H01M 10/0585* (2013.01); *H01M 2004/021* (2013.01)

(58) Field of Classification Search
CPC ..................................................... H01M 4/667
See application file for complete search history.

(56) References Cited

FOREIGN PATENT DOCUMENTS

| | | | | |
|---|---|---|---|---|
| CN | 202293491 U | 7/2012 | | |
| CN | 106910897 A | 6/2017 | | |
| CN | 111048789 A | * | 4/2020 | .......... H01M 10/613 |
| CN | 112201792 A | * | 1/2021 | ........... H01M 4/663 |
| JP | 2004178914 A | 6/2004 | | |

OTHER PUBLICATIONS

Office Action dated Mar. 16, 2023 from German Patent Office for German Patent Application No. 102022120953.9; 3 pages.

* cited by examiner

*Primary Examiner* — Stephan J Essex

(57) ABSTRACT

A battery cell includes a plurality of cathodes and a plurality of anodes. A plurality of solid electrolyte layers are arranged between first adjacent ones of the plurality of cathodes and the plurality of anodes. A plurality of clad current collectors are arranged between second adjacent ones of the plurality of cathodes and the plurality of anodes. The plurality of clad current collector includes a first foil layer, a second foil layer and a thermal interface layer including adhesive and at least one material that increases thermal and electrical conductivity of the thermal interface layer.

9 Claims, 4 Drawing Sheets

CLAD CURRENT COLLECTORS INCLUDING THERMAL INTERFACE LAYER FOR BIPOLAR SOLID-STATE BATTERIES

CROSS-REFERENCE TO RELATED APPLICATIONS

This application claims the benefit of Chinese Patent Application No. 202210906230.9, filed on Jul. 29, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery systems, and more particularly to a clad current collector including a thermal interface layer for solid state battery cells.

Electric vehicles (EVs) such as battery electric vehicles (BEVs), hybrid vehicles, and/or fuel cell vehicles include one or more electric machines and a battery system including one or more battery cells, modules and/or packs. A power control system is used to control power to/from the battery system during charging, propulsion and/or regeneration.

The battery cells may include a solid electrolyte. The use of solid electrolytes enhances the tolerance of the battery cell to abusive conditions and broadens a working temperature range of the battery cell. Solid electrolytes also enable the implementation of bipolar battery cells.

SUMMARY

A battery cell includes a plurality of cathodes and a plurality of anodes. A plurality of solid electrolyte layers are arranged between first adjacent ones of the plurality of cathodes and the plurality of anodes. A plurality of clad current collectors is arranged between second adjacent ones of the plurality of cathodes and the plurality of anodes. The plurality of clad current collector includes a first foil layer, a second foil layer and a thermal interface layer including adhesive and at least one material that increases thermal and electrical conductivity of the thermal interface layer.

In other features, the at least one material includes a first material and a second material. The first foil layer comprises copper (Cu) and the second foil layer comprises aluminum (Al). The adhesive comprises polyolefin adhesive, the first material comprises pyrolytic graphite sheets, and the second material comprises carbon nanotubes.

In other features, the first material comprises 20 to 95 vol % of the thermal interface layer. The second material comprises 1 to 30 vol % of the thermal interface layer. The adhesive comprises 2 to 50 vol % of the thermal interface layer.

In other features, the first foil layer has a thickness in a range from 1 μm to 30 μm, the second foil layer has a thickness in a range from 1 μm to 30 μm, the thermal interface layer has a thickness in a range from 1 μm to 30 μm, and the plurality of clad current collectors have a thickness in a range from 3 μm to 90 μm.

In other features, the first material is selected from a group consisting of pyrolytic graphite sheets, graphene (Gr), natural crystalline flake graphite, poly-crystalline graphite, highly-oriented pyrolytic graphite (HOPG), graphite block, graphite nanoplates, pillared graphene, and metallic inorganic frameworks. The second material is selected from a group consisting of carbon fibers, single layer graphene nanoribbons, graphite nanoribbons, and carbon nanobars. The adhesive is selected from a group consisting of polyethylene resin, polypropylene resin, polybutylene resin, urethane resin, polyamide resin, a resin containing an amorphous polypropylene resin, silicone, polyimide resin, epoxy resin, acrylic resin, rubber, isocyanate adhesive, acrylic resin adhesive, and cyanoacrylate adhesive. The first foil layer includes a material selected from a group consisting of copper (Cu), aluminum (Al), stainless steel, nickel (Ni), iron (Fe), titanium (Ti), tin (Sn), and combinations thereof.

A method for manufacturing a clad current collector for a battery cell, comprises supplying a first foil layer between a first roller and a second roller; supplying a second foil layer between the first roller and the second roller; supplying a thermal interface layer including adhesive and at least one material, that increases thermal and electrical conductivity, between the first roller and the second roller; and applying heat and pressure to the first foil layer, the second foil layer and the thermal interface layer.

In other features, the at least one material includes a first material and a second material. The first foil layer comprises copper (Cu) and the second foil layer comprises aluminum (Al). The adhesive comprises polyolefin adhesive. The first material comprises pyrolytic graphite sheets. The second material comprises carbon nanotubes.

In other features, the first material comprises 20 to 95 vol % of the thermal interface layer. The second material comprises 1 to 30 vol % of the thermal interface layer. The adhesive comprises 2 to 50 vol % of the thermal interface layer. The first foil layer has a thickness in a range from 1 μm to 30 μm. The second foil layer has a thickness in a range from 1 μm to 30 μm. The thermal interface layer has a thickness in a range from 1 to 30 μm. The clad current collector has a thickness in a range from 3 μm to 90 μm.

In other features, the at least one material is selected from a group consisting of pyrolytic graphite sheets, graphene (Gr), natural crystalline flake graphite, poly-crystalline graphite, highly-oriented pyrolytic graphite (HOPG), graphite block, graphite nanoplates, pillared graphene, and metallic inorganic frameworks. The at least one material is selected from a group consisting of carbon fibers, single layer graphene nanoribbons, graphite nanoribbons, and carbon nanobars.

In other features, the adhesive is selected from a group consisting of polyethylene resin, polypropylene resin, polybutylene resin, urethane resin, polyamide resin, a resin containing an amorphous polypropylene resin, silicone, polyimide resin, epoxy resin, acrylic resin, rubber, isocyanate adhesive, acrylic resin adhesive, and cyanoacrylate adhesive. The first foil layer includes a material selected from a group consisting of copper (Cu), aluminum (Al), stainless steel, nickel (Ni), iron (Fe), titanium (Ti), tin (Sn), and combinations thereof.

A clad foil current collector for a bipolar battery cell includes a first foil layer made of copper (Cu), a second foil layer made of aluminum (Al), and a thermal interface layer arranged between the first foil layer and the second foil layer. The thermal interface layer included a hotmelt adhesive comprising polyolefin, a first material comprising pyrolytic graphite sheets, and a second material comprising carbon nanotubes.

In other features, the first material comprises 20 to 95 vol % of the thermal interface layer; the second material comprises 1 to 30 vol % of the thermal interface layer; and the adhesive comprises 2 to 50 vol % of the thermal interface layer.

In other features, the first foil layer has a thickness in a range from 1 µm to 30 µm; the second foil layer has a thickness in a range from 1 µm to 30 µm; the thermal interface layer has a thickness in a range from 1 to 30 µm; and the clad foil current collector has a thickness in a range from 3 µm to 90 µm.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While the following description relates to bipolar battery cells for electric vehicles, skilled artisans will appreciate that the bipolar battery cells described herein can be used in other applications.

Existing bipolar solid-state batteries (SSBs) may include bipolar electrodes with current collectors made of a clad foil layer. The clad foil layer is generally thick and has an inferior mechanical bonding between individual metal layers thereof. In addition, the fabrication process is time consuming and energy inefficient.

The present disclosure relates to a current collector made of a clad foil layer with a thermal interface layer for bipolar solid-state battery (SSB) applications. First and second metal foil layers (e.g., Al and Cu foil layers) are bonded together by the thermal interface layer. The thermal interface layer is thermally and electrically conducting and includes adhesive and one or more materials that increase thermal and electrical conductivity. In some examples, the one or more materials include a first material (such as pyrolytic graphite sheets (PGSs)) and a second material (such as carbon nanotubes (CNTs)) and the adhesive includes hotmelt adhesive such as polyolefin.

Within the clad foil layer, the hotmelt adhesive provides bonding strength to the facing foil layer surfaces to improve mechanical integrity. The first and second materials increase electrical and thermal conductivity to help release and diffuse heat generated within the battery cells. In some examples, the clad foil current collectors are manufactured using a hot-rolling (pressing) procedure, which provides a low-cost route for large-scale production.

Figure 1:
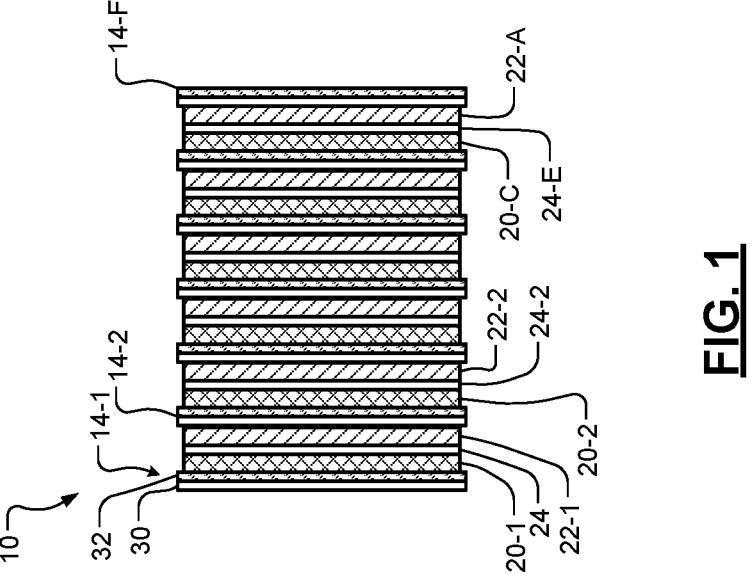
FIG. 1 is a side cross-sectional view of an example of a bipolar battery cell including a current collector made of clad foil layer.

Referring now to FIG. 1, an example of a bipolar battery cell 10 including current collectors made of a clad foil layer (without an intervening thermal interface layer) is shown. The bipolar battery cell 10 includes cathodes 20-1, 20-2, . . . , and 20-C (collectively or individually cathode(s) 20), anodes 22-1, 22-2, . . . , and 22-A (collectively or individually anode(s) 22), and solid electrolyte 24. The battery cell 10 further includes current collectors 14-1, 14-2, . . . , and 14-F (collectively or individually current collectors 14). C, A, E and F are integers greater than one. The battery cell 10 includes a repeating pattern including the current collector 14, the cathode 20, the solid electrolyte 24, the anode 22, and the current collector 14. The current collectors 14 are shared with adjacent anodes/cathodes.

The current collectors 14 are made of a clad foil layer including a first foil layer 30 (such as copper (Cu)) and a second foil layer 32 (such as aluminum (Al)) that are pressed together. The first foil layer 30 is arranged adjacent to and in direct contact with the anodes 22. The second foil layer 32 (such as aluminum (Al)) is arranged adjacent to and in direct contact with the cathodes 20. Inner surfaces of the first foil layer 30 and the second foil layer 32 are in direct contact.

Figure 2:
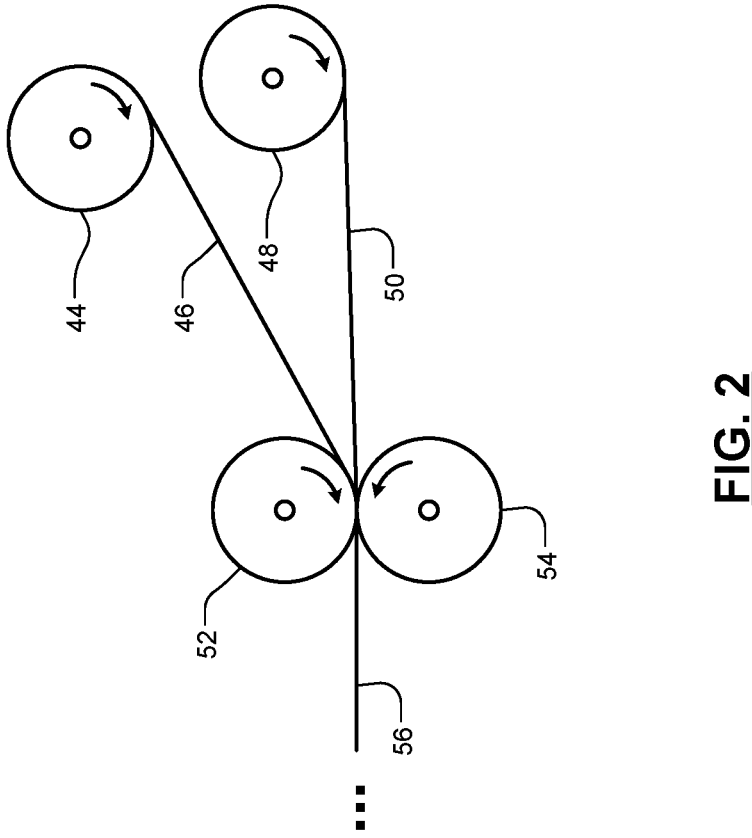
FIG. 2 illustrates a method for manufacturing a clad foil layer of FIG. 1.

Referring now to FIG. 2, manufacturing of the clad foil layer of FIG. 1 is shown. Clad current collectors can be manufactured via a physical roll bonding process. First and second foil layers 46, 50 from first and second rollers 44, 48, respectively, are fed between third and fourth rollers 52, 54 that apply high pressure to the first and second foil layers 46, 50 to create a clad foil layer 56.

When creating the clad foil layer 56 using aluminum and copper foil layers, bonding occurs only when surfaces of the first and second foil layers 46, 50 are cleaned properly and then compressed with a sufficiently large pressure between the third and fourth rollers 44, 48.

During cladding, the pressure must be high enough to deform the metal. Therefore, it is difficult to achieve a thin thickness in a range from 35 µm to 500 µm. The clad foil layer also needs to be annealed (at a temperature below the melting point of the foil layer materials) for a long period for sufficient mechanical bonding between individual foil layers. In some cases, the Al foil layer starts to delaminate and fail during bending of the clad foil layer during manufacturing.

Figure 3:
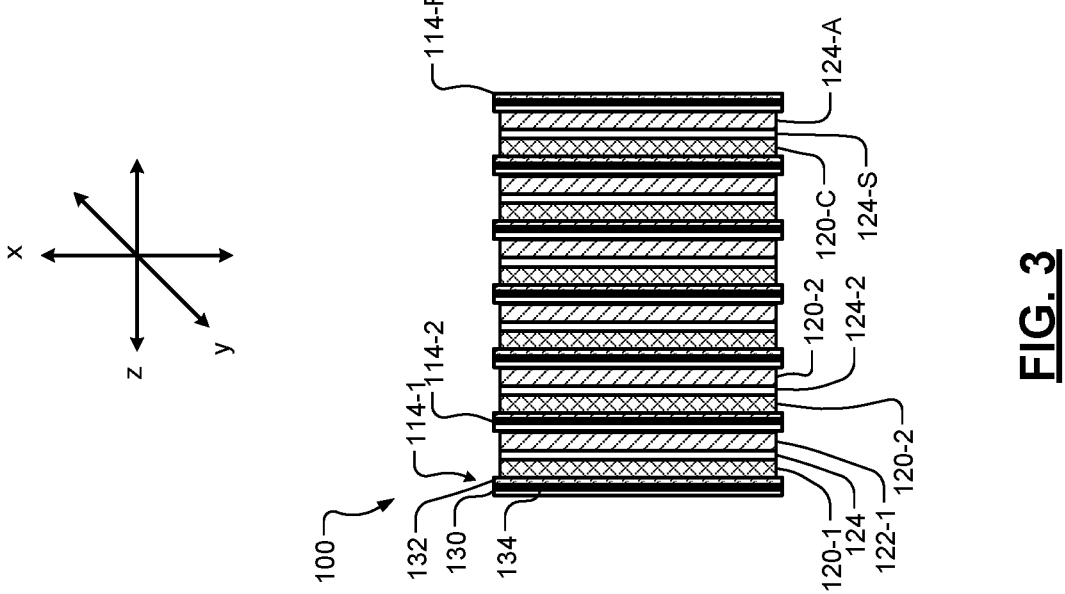
FIG. 3 is a side cross-sectional view of an example of a bipolar battery cell including a current collector made of clad foil layer with a thermal interface layer according to the present disclosure.

Referring now to FIG. 3, an example of a bipolar battery cell 100 including a current collector made of clad foil layer with a thermal interface layer is shown. The bipolar battery cell 100 includes cathodes 120-1, 120-2, . . . , and 120-C (collectively or individually cathode(s) 120), anodes 122-1, 122-2, . . . , and 122-A (collectively or individually anode(s) 122), and solid electrolyte electrolyte 124. The battery cell 100 further includes current collectors 114-1, 114-2, . . . , and 114-F (collectively or individually current collector(s) 114), where C, A, E and F are integers. In some examples, C=A=E and F=C+1. The battery cell 100 includes a repeating pattern including the current collector 114, the cathode 120, the solid electrolyte 124, the anode 122, and the current collector 114. The current collectors 114 are shared with adjacent anodes/cathodes.

The current collectors 114 are made of a clad foil layer including a first foil layer 130 (such as copper (Cu)), a second foil layer 132 (such as aluminum (Al)), and a thermal interface layer 134 arranged there between. The first foil layer 130 of the cladding is arranged adjacent to and in direct contact with the anodes 22. The second foil layer 132 (such as aluminum (Al)) is arranged adjacent to and in direct contact with the cathodes 120. Inner surfaces of the first foil layer 130 and the second foil layer 132 are in contact with the thermal interface layer 134.

Figure 4:
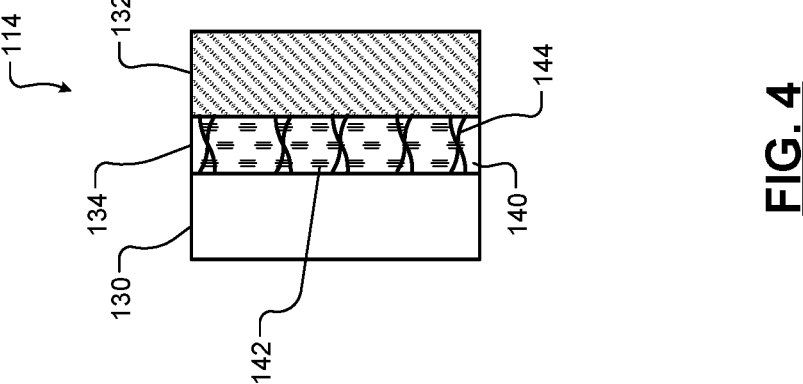
FIG. 4 is an enlarged view of an example of the thermal interface layer according to the present disclosure.

Referring now to FIG. 4, an example of the thermal interface layer 134 is shown. The thermal interface layer 134 is arranged between the first foil layer 130 and the second foil layer 132. The thermal interface layer 134 includes adhesive 140 and one or more materials that increase thermal and/or electrical conductivity. In some examples, the one or more materials include a first material 142 (such as pyrolytic graphite sheets (PGSs)) and a second material 144 (such as carbon nanotubes (CNTs)).

In some examples, the adhesive 140 comprises polyolefin adhesive, although other types of adhesive can be used. In some examples, the first material 142 comprises 20 to 95 vol % (e.g., 70 vol %) of the thermal interface layer, the second material 144 comprises 1 to 30 vol % (e.g., 5 vol %) of the thermal interface layer, and the hotmelt adhesive 140 comprises 2 to 50 vol % (e.g., 25 vol %) of the thermal interface layer. In some examples, the first foil layer 130 has a thickness in a range from 1 $\mu$m to 30 $\mu$m (e.g., 6 $\mu$m). In some examples, the second foil layer 132 has a thickness in a range from 1 $\mu$m to 30 $\mu$m (e.g., 6 $\mu$m). In some examples, the thermal interface layer 134 has a thickness in a range from 1 to 30 $\mu$m (e.g., 4 $\mu$m). In some examples, the current collector has a thickness in a range from 3 $\mu$m to 90 $\mu$m (e.g., 16 $\mu$m).

In some examples, the pyrolytic graphite sheets (PGSs) and carbon nanotubes (CNTs) provide a thermally and electrically conducting layer for the clad foil layer. The Al foil layer has an electrical conductivity of $3.5\times10^5$ Siemens per centimeter (S/cm) and a density of 2.7 g/cm$^3$. The Cu foil layer has an electrical conductivity of $6.0\times10^5$ S/cm and a density of 8.9 g/cm$^3$. The PGSs have an electrical conductivity of $>1.3\times10^4$ S/cm and a density of 1.9 to 2.1 g/cm$^3$. The CNTs have an electrical conductivity of $3.8\times10^5$ S/cm and a density of 2.1 g/cm$^3$. The low density CNTs help to build a 3D conduction network (especially in the z axis in FIG. 3), which facilitates electron conduction between battery cell units in bipolar SSBs.

The Al foil layer has a thermal conductivity of 234 Watts per meter Kelvin (W/mK). The Cu foil layer has a thermal conductivity of 386-400 W/mK. The PGSs have a thermal conductivity of 1400 to 1900 (in-plane) W/mK. The CNTs have a thermal conductivity of >2000 W/mK. Lower cost PNGs together with the CNTs have high thermal conductivities that enable excellent heat diffusion, especially at the xy plane.

The clad foil layer with the thermal interface layer conducts the electrons between cell units (in the z-axis), and releases and diffuses heat generated within cell unit during operation of the bipolar SSB (in the xy plane). The clad foil layer with the thermal interface can be produced with thickness of 16 $\mu$m or less with excellent mechanical integrity due to the hotmelt adhesive. The polyolefin adhesive provides strong bonding strength to surfaces of the Al foil layer and the Cu foil layer. The foil layers are hard to separate even after soaking in electrolyte.

Figure 5B:
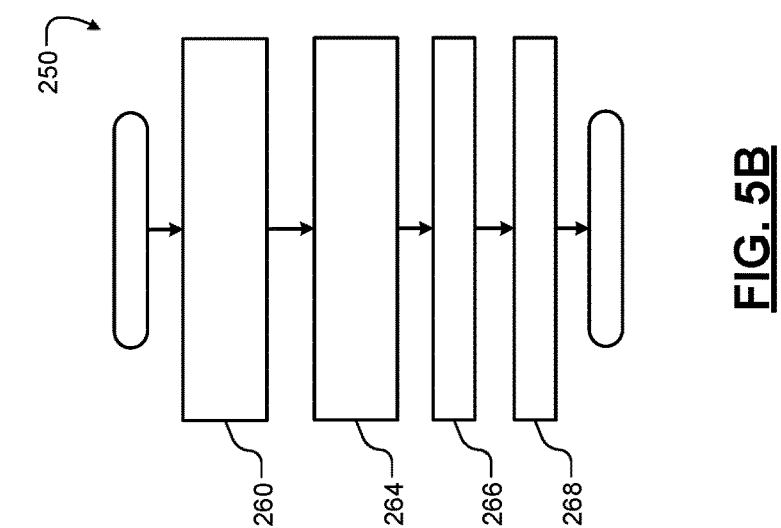
FIG. 5B is a flowchart of an example of a method for manufacturing the current collector made of the clad foil layer with the thermal interface layer according to the present disclosure.
Figure 5A:
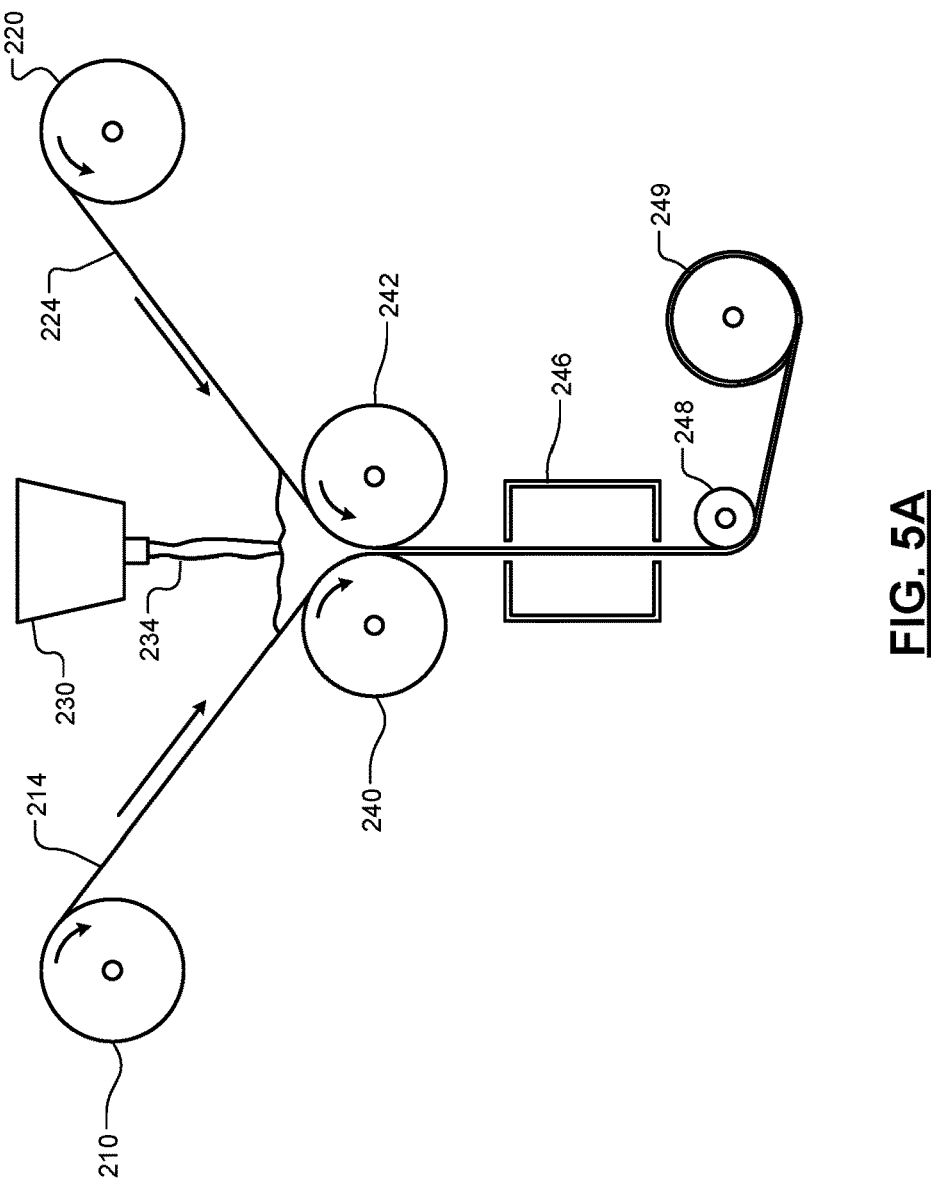
FIG. 5A illustrates manufacturing of the current collector made of the clad foil layer with the thermal interface layer according to the present disclosure.

Referring now to FIG. 5A, manufacturing of the current collector made of clad foil layer with the thermal interface layer according to the present disclosure is shown. First and second foil layers 214, 224 (e.g., Al foil layer and Cu foil layer) from first and second rollers 210, 220, respectively, are fed between third and fourth rollers 240, 242. At the same time, a source 230 feeds composite materials (including the first material, the second material and the hotmelt adhesive) between the first and second foil layers 214, 224 above the third and fourth rollers 240, 242. The third and fourth rollers 240, 242 apply heat and pressure. In some examples, source 230 and the third and fourth rollers 240, 242 are heated in a range from 80° C. to 250° C. After pressing, the clad foil layer passes through a chiller 246, over a roller 248 and onto a roll 249.

Referring now to FIG. 5B, a method 250 is shown. The method 250 includes heating the composite material for the thermal interface layer and delivering the heated composite material between the first and second foil layers above the rollers at 260. The first and second foil layers are fed through rollers that apply heat and pressure at 264. After passing through the rollers, the clad foil layer is cooled at 266 and rolled at 268.

Figures 6A, 6B:
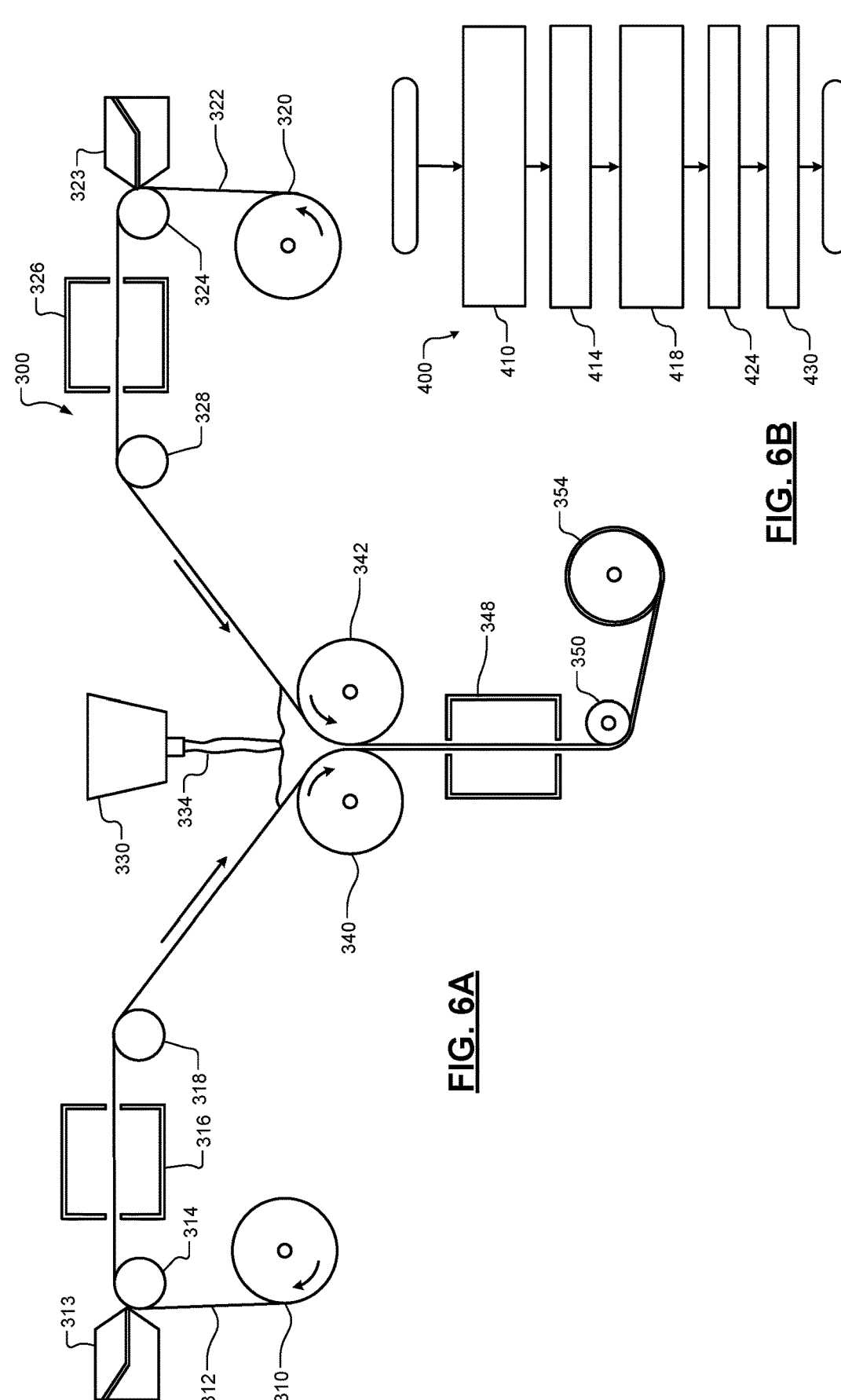
FIG. 6A illustrates an example of a method for manufacturing the current collector made of the clad foil layer with the thermal interface layer according to the present disclosure.
FIG. 6B is a flowchart of an example of a method for manufacturing the current collector made of the clad foil layer with the thermal interface layer according to the present disclosure.

Referring now to FIG. 6A, another process for manufacturing of the current collector made of clad foil layer with the thermal interface layer is shown. A slurry 313, 323 including the first material, the second material and other materials is applied to first and second foil layers 312, 322 (e.g., Al foil layer and Cu foil layer) from first and second rollers 310, 320. After the slurry is applied, the first and second foil layers 312, 322 are fed through first and second heaters 316, 326 located between pairs of rollers 314, 318 and 324, 328, respectively, to remove the other materials.

A source 330 feeds adhesive 334 between the first and second foil layers 214, 224 above third and fourth rollers 340, 342. The third and fourth rollers 340, 342 apply heat and pressure to the first foil layer, the thermal interface layer, and the second foil layer. In some examples, source 330 and the rollers 340, 342 are heated to a temperature in a range from 80° C. to 250° C. After pressing, the clad foil layer through a chiller 348, over a roller 350 and onto a roll 354.

Referring now to FIG. 6B, a method 400 is shown. The method 400 includes supplying a slurry including the first material, the second material, and other materials such as solvents onto the first and second foil layers at 410. At 414, the first and second foil layers and the slurry are heated to remove the other materials. At 418, the adhesive is heated and delivered between the first and second foil layers above the rollers. The first and second foil layers with the slurry are fed through the rollers that apply heat and pressure at 418. After passing through the rollers, the clad foil layer is cooled at 424 and rolled at 430.

As can be appreciated, the first material can include materials other than the pyrolytic graphite sheets (PGSs). In some examples, the first material can be selected from a group consisting of graphene (Gr), natural crystalline flake graphite, poly-crystalline graphite, highly oriented pyrolytic graphite (HOPG), graphite block, graphite nanoplates, pillared graphene, metallic inorganic frameworks, and other materials. In some examples, the first material is a 3D material.

In some examples, the carbon nanotubes (CNTs) (a 1D material) can be replaced by at least one of carbon fibers, single layer graphene nanoribbons, graphite nanoribbons, carbon nanobars, and other materials.

In some examples, other thermally or electrically conductive materials can be introduced (0 to 50 vol %) including 0D nanostructure materials such as carbon nanoparticles, clusters, metal nanoparticles or 2D nanostructure materials such as nanofilms, graphene, graphene oxide, and two layered graphene.

In other examples, the hotmelt adhesive in thermal interface layer can include polyolefin (such as polyethylene resin, polypropylene resin, and polybutylene resin), other hot-melt adhesives (such as urethane resin, and polyamide resin), and/or a resin containing an amorphous polypropylene resin as a main component and obtained by copolymerizing ethylene, propylene, and butene. In other examples, the adhesive can include silicone, polyimide resin, or epoxy resin. In other examples, the adhesive can include acrylic resin, rubber (such as ethylene-propylenediene rubber (EPDM)), isocyanate adhesive, acrylic resin adhesive, and/or cyanoacrylate adhesive.

The first and/or second foil layers can include a material selected from a group consisting of stainless steel, nickel (Ni), iron (Fe), titanium (Ti), tin (Sn), or alloys thereof. In other examples, the first and/or second foil layers include coated foil layer such as graphene or carbon coated aluminum foil layer (which are corrosion free).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A battery cell, comprising:
a plurality of cathodes;
a plurality of anodes;
a plurality of solid electrolyte layers arranged between first adjacent ones of the plurality of cathodes and the plurality of anodes;
a plurality of clad current collectors arranged between second adjacent ones of the plurality of cathodes and the plurality of anodes,
wherein the plurality of clad current collector includes:
a first foil layer including copper;
a second foil layer including aluminum; and
a thermal interface layer including a polyolefin hotmelt adhesive at 25% volume, pyrolytic graphite sheets at 70% volume, and carbon nanotubes at 5% volume of the thermal interface layer.

2. The battery cell of claim 1, wherein:
the first foil layer has a thickness in a range from 1 μm to 30 μm;
the second foil layer has a thickness in a range from 1 μm to 30 μm;
the thermal interface layer has a thickness in a range from 1 μm to 30 μm; and
the plurality of clad current collectors have a thickness in a range from 3 μm to 90 μm.

3. The battery cell of claim 1, wherein:
the first foil layer has a thickness of 6 μm;
the second foil layer has a thickness of 6 μm;
the thermal interface layer has a thickness of 4 μm; and
the plurality of clad current collectors have a thickness of 16 μm.

4. A method for manufacturing a clad current collector for a battery cell, comprising:
supplying a first foil layer between a first roller and a second roller, the first foil layer including copper;
supplying a second foil layer between the first roller and the second roller, the second foil layer including aluminum;
supplying a thermal interface layer including a polyolefin hotmelt adhesive at 25% volume, pyrolytic graphite sheets at 70% volume, and carbon nanotubes at 5% volume of the thermal interface layer; and
applying heat and pressure to the first foil layer, the second foil layer and the thermal interface layer.

5. The method of claim 4, wherein:
the first foil layer has a thickness in a range from 1 μm to 30 μm;
the second foil layer has a thickness in a range from 1 μm to 30 μm;
the thermal interface layer has a thickness in a range from 1 to 30 μm; and
the clad current collector has a thickness in a range from 3 μm to 90 μm.

6. The method of claim 4, wherein:
the first foil layer has a thickness of 6 μm;
the second foil layer has a thickness of 6 μm;
the thermal interface layer has a thickness of 4 μm; and
the clad current collector has a thickness of 16 μm.

7. A clad foil current collector for a bipolar battery cells, comprising:

a first foil layer made of copper (Cu);

a second foil layer made of aluminum (Al); and a thermal interface layer arranged between the first foil layer and the second foil layer including:

a hotmelt adhesive comprising polyolefin at 25% volume of the thermal interface layer;

a first material comprising pyrolytic graphite sheets at 70% volume of the thermal interface layer; and a second material comprising carbon nanotubes at 5% volume of the thermal interface layer.

8. The clad foil current collector of claim 7, wherein:

the first foil layer has a thickness in a range from 1 μm to 30 μm;

the second foil layer has a thickness in a range from 1 μm to 30 μm;

the thermal interface layer has a thickness in a range from 1 to 30 μm; and the clad foil current collector has a thickness in a range from 3 μm to 90 μm.

9. The clad foil current collector of claim 7, wherein:

the first foil layer has a thickness of 6 μm;

the second foil layer has a thickness of 6 μm;

the thermal interface layer has a thickness of 4 μm; and the clad foil current collector has a thickness of 16 μm.

\* \* \* \* \*